NONDESTRUCTIVE READOUT THIN FILM MEMORY

Filed Dec. 18, 1962 2 Sheets-Sheet 1

INVENTORS
HELMUT P. LOUIS
WOLFGANG DIETRICH
BY
ATTORNEY

United States Patent Office
3,304,543
Patented Feb. 14, 1967

3,304,543

NONDESTRUCTIVE READOUT THIN FILM MEMORY

Helmut P. Louis, Briarcliff Manor, N.Y., and Wolfgang Dietrich, Adliswil, Zurich, Switzerland, assignors to International Business Machines Corporation, New York, N.Y., a corporation of New York Filed Dec. 18, 1962, Ser. No. 245,473
Claims priority, application Switzerland, Mar. 8, 1962, 2,801/62
11 Claims. (Cl. 340—174)

This invention relates to magnetic memories employing anisotropic thin magnetic films and, more particularly, to a nondestructive readout magnetic thin film memory.

Thin magnetic films have received increasing attention during the past few years as prospective computer components. The decrease in total magnetizing energy with decreasing thickness in volume and higher switching speeds have been the primary factors which has led to the investigation of thin magnetic films. Thin magnetic films may be produced in different ways to exhibit uniaxial anisotropy. Uniaxial anisotropy is understood to mean that tendency of the magnetization all over the film to align itself along a preferred axis of magnetization. This preferred axis is often referred to as the "easy axis," while the direction of magnetization perpendicular to this axis in the plane of the film is referred to as the "hard direction" of magnetization. Uniaxial thin magnetic films then exhibit a single easy axis of magnetization defining opposite stable states of remanent flux orientation. It is this characteristic of thin magnetic film elements which is utilized to store binary information, in that, the opposite oriented stable directions of flux are utilized to designate the different binary values, 0 and 1.

A. V. Pohm et al. suggested the use of plane magnetic thin film elements exhibiting uniaxial anisotropy for a memory in an article entitled, "A Compact Coincident-Current Memory," Proceedings of the Eastern Joint Computer Conference, New York, New York, December 1956, pages 120–124, and others, such as Eric E. Bittman in an article entitled, "Using Thin Films in High Speed Memories," appearing in Electronics, June 5, 1959; S. Methfessel et al., in an article entitled, "Thin Magnetic Films," UNESCO, Proceedings of the International Conference Information Processing (Proc. I.C.I.P.), Paris, June 15–20, 1959; and K. Raffel et al. in an article entitled, "A Computer Using Magnetic Films," UNESCO, Proceedings of the I.C.I.P., June 15–20, 1959, also proposed the use of such uniaxial thin film elements in coincident-current selection memories.

Heretofore, such memories have been word organized and the word drive has been utilized to rotate the magnetization of each thin magnetic film coupled toward the hard direction while coincidently the bit drivers are utilized to thereafter apply a field along the easy axis of the film elements and thereby establish the state to which the magnetization relaxes upon termination of the word drive field. Readout is accomplished when the word drive field is applied since the polarity of the voltage induced in each bit sense line is indicative of the previous state in which the thin film element resided. Such memories destroy the information retained and are termed "destructive readout memories."

In order to fulfill all requirements, such memories should be compact, have a large storage capacity, fast access time, a minimum of hardware, and be capable of being nondestructively read out. In order to provide high capacity storage, the individual storage elements must be made very small; however, it has been found that the smaller the element the smaller the signal which is obtained upon readout, necessitating amplifiers in the output circuits. The requirement for amplifiers has been somewhat alleviated by the use of a word drive field which considerably exceeds the anisotropy field of the film. Such drive fields in combination with easy axis fields cause rotational switching of the thin film elements which is much faster than domain wall switching. The use of a drive field which exceeds the anisotropy field of the elements causes a complete rotation of the magnetization into the hard direction, or 90° with respect to the easy axis. With nothing more, upon termination of such a drive field, the magnetization splits up into many individual small domains, some of which orient themselves in one stable state along the easy axis while the remaining orient themselves oppositely along the easy axis. Therefore, the use of such a high field necessarily requires that an easy axis field be applied to the thin film before domain split up can occur.

In order to achieve nondestructive readout, it has been proposed to utilize a word field which deflects the magnetization of the thin film element partially toward the hard direction, so that upon termination of the word field, the magnetization of the film element will relax back to its former remanent stable state. Utilization of such a field does accomplish nondestructive readout, but has been shown to be harmful in attaining the desired requirements of such memories. Since the word field must have a small magnitude, speed is sacrificed along with attendant loss in high output signals. If the word conductor is oriented such as to only apply a field at say an angle smaller than 90° with respect to the easy axis and a high magnitude field is applied, amplifiers on the sense line must again be utilized, increasing hardware requirements.

By employing the structure here disclosed, nondestructive readout of such memories is accomplished without sacrifice of speed or the need for additional hardware. This is accomplished by constructing a word organized thin magnetic film memory in a fashion heretofore known except that the bit line conductors are provided in such a close proximity to the thin magnetic film elements that when the word drive field is applied to rotate the magnetization of the thin films coupled into the hard direction, eddy currents are induced in the bit drive lines and other neighboring conductors. Before decay of the induced eddy currents in the bit drive lines and other conductors, the word drive field is terminated to allow the field generated by the eddy currents to apply an easy axis field to the thin film and thereby unambiguously return its magnetization back to its original stable state.

Accordingly, it is a prime object of this invention to provide an improved magnetic thin film memory.

Another object of this invention is to provide an improved nondestructive readout magnetic thin film memory.

Still another object of this invention is to provide an improved magnetic thin film memory wherein nondestructive readout is accomplished by utilizing induced eddy currents in drive lines.

Yet another object of this invention is to provide a magnetic thin film memory having bit and word drive lines for applying easy axis and hard axis fields to each thin film, respectively, wherein the hard axis field is applied to saturate the thin film in the hard direction to thereby induce an eddy current in the bit drive line and other nearby conductive members, and the hard axis field is terminated before decay of the induced eddy current to allow application of a field to the film which causes orientation of the film magnetization back to its original state.

The foregoing and other objects, features and advantages of the invention will be apparent from the following more particular description of preferred embodiments of the invention, as illustrated in the accompanying drawings.

Figures 5A, 5B:
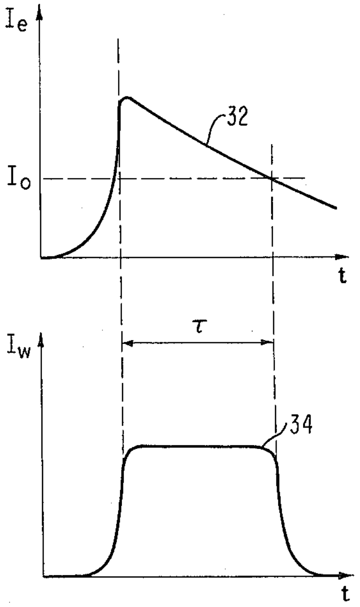

FIG. 5*a* illustrates a plot of induced eddy currents versus time; and

FIG. 5*b* illustrates a plot of applied field versus time for current applied to a word conductor in relationship to the plot of FIG. 5*a*.

Figure 1:
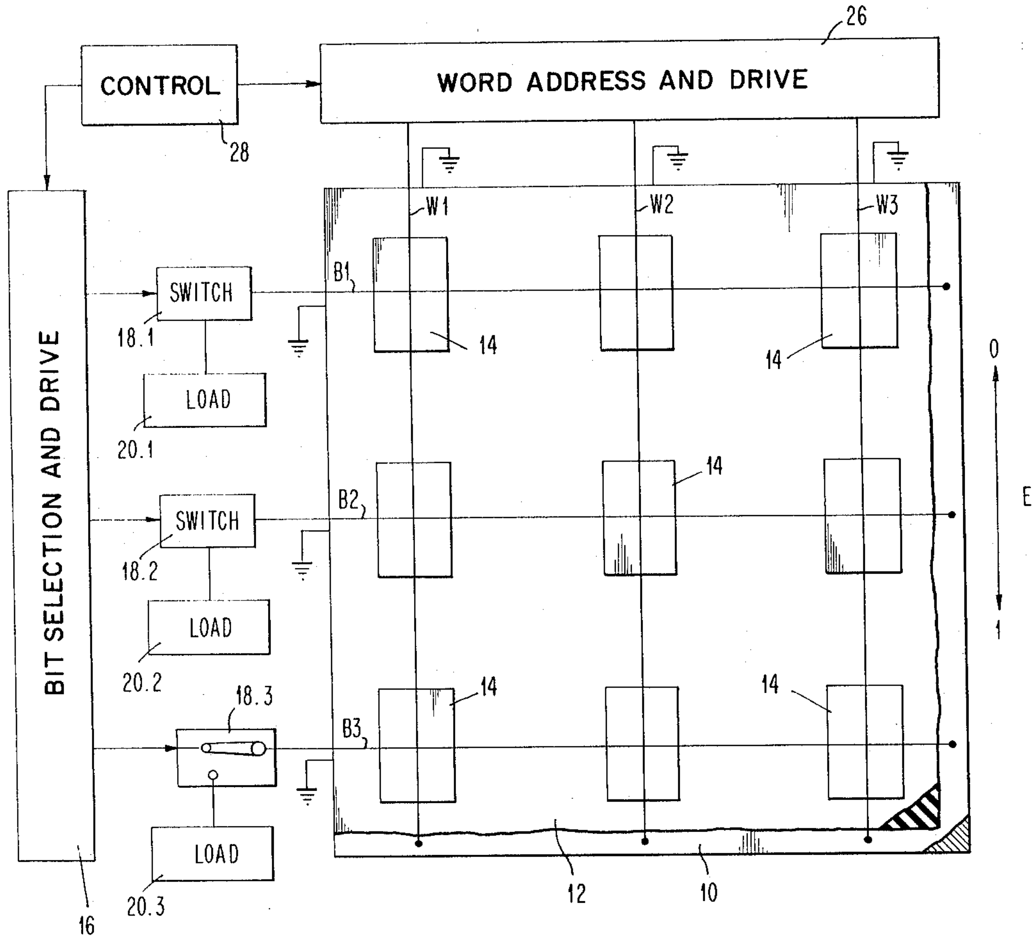
FIG. 1 is a schematic of a magnetic memory utilized for this invention.
Figure 2:
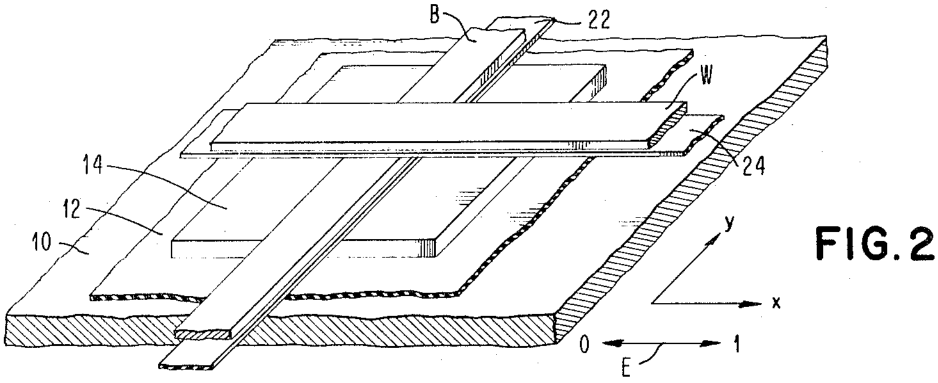
FIG. 2 illustrates an enlarged perspective view of a portion of the memory of FIG. 1.

Referring to FIGS. 1 and 2, a thin film memory structure is employed for carrying out this invention. FIG. 1 is a schematic of the memory while FIG. 2 is a perspective view of an enlarged section of one portion of the memory of FIG. 1 which comprises a single storage cell. The memory comprises a conductive base plate member 10 having an insulating layer 12 thereon and storage cells 14 deposited on the insulating layer 12. The storage cells 14 are arranged in word columns and bit rows and are uniaxial anisotropic thin magnetic films. Each cell 14 is made of ferromagnetic material such as an alloy of 80% nickel and 20% iron (80% Ni-20% Fe) having a thickness of approximately 500 A. The cells 14 may be produced in accordance with any one of a number of known processes such as vacuum evaporation, cathode sputtering, chemical precipitation or electrolytic deposition onto the metallic base plate 10. During the process, a magnetic field is provided which causes each cell 14 to exhibit uniaxial anisotropic characteristics, defining an easy axis of remanent flux orientation designated by a double-headed arrow labelled E. The cells 14 may be round, oval, square or rectangular in shape; however, the structure here provided is rectangular where the easy axis E of each cell 14 is parallel with the longer edge. The length of each cell 14 is approximately 0.4 to 0.5 mm., while the width is approximately 0.3 mm.

The pattern of the storage cells 14 arranged in rows and columns can be produced in a number of ways. For instance, during the process of manufacture by vacuum deposition a masking technique may be employed to ensure that the particles are deposited only at desired locations in any particular shape, the shape being dictated by the apertures in the mask. Another method which may be employed is to eliminate the mask and deposit the metallic alloy by any one of the forementioned processes and subsequently removing undesired portions of the deposited coating by means of photo-etching.

The base plate 10 is made of material such as silver which exhibits good electrical conducting properties having at least the surface upon which the insulating layer 12 is deposited highly polished. The insulating layer 12 consists of a thin film deposition of silicon oxide (SiO) which not only insulates the cells 14 from the base plate 10, but smooths and compensates any remaining surface roughness of the polished surface of the base plate 10 providing better adherent qualities of the cells 14 such as disclosed in a copending application, Serial No. 149,560, filed Nov. 2, 1961, now Patent No. 3,161,946 and assigned to the assignee of this application.

A plurality of row conductors B1–B3 are provided each coupling all the cells 14 in a respective row, transverse with respect to the easy axis E of each cell. Each row conductor B has one end ohmically connected to the base plate 10 and the other end connected to a bit selection and drive means 16 through a switching means 18.1–18.3, respectively. Connected to each of the switching means 18.1–18.3 is a respective load 20.1–20.3. The conductors B are fabricated by deposition of a conductive material through a mask and usually an insulating layer 22 of silicon oxide is first deposited through the mask and thereafter the conductive material is deposited on the insulating material 22 to provide the row conductors B in the form of striplines.

A plurality of column word conductors W1–W3 are provided for the memory by first depositing an insulating layer 24 by the use of a masking technique and thereafter depositing conductive material through the masks to form stripline conductors W. The conductors W are so fabricated as to be positioned orthogonal with respect to the conductors B and the easy axis E of the cells 14, each of which couples all the cells 14 in a respective column. One end of each conductor W is then ohmically connected to the conductive base plate 10 while the other end is connected to a word address and drive means 26. A control means 28 is provided which is connected to both the selection and drive means 16 and the word address and drive means 26 to control the timing of pulses from these means in operatinig the memory.

The switching means 18 are utilized to selectively connect the row conductors B to the drive means 16 during a write portion of the memory cycle and to connect the row conductors B to the loads 20 during the read portion of the memory cycle. Thus, the conductors B serve the dual function of acting as an input drive line during the write portion of the memory cycle and as an output sense line during the read portion of the memory cycle. As will be shown and described subsequently with reference to FIG. 4, the switching means 18 may be eliminated by providing a further row conductor on top of the conductor W with a suitable intermediate insulating layer. This further row conductor would then be directly connected to the drive means 16, while the conductors B would be utilized as the output sense lines. Such a memory organization is shown in a copending application, Ser. No. 217,768, filed Aug. 17, 1962, now Patent No. 3,257,649 which is assigned to the assignee of this application. Further, if desired, the row conductors B may be made up of several conductors, one of which may be directly connected to the respective load 20 while the remaining are connected to the drive means 16.

Energization of any one word conductor W applies a field to each cell 14 coupled thereby which is directed in the plane of the cell transverse with respect to its easy axis E, which is referred to as the hard direction of the cell. Since it is desired to keep the direction of this applied field as close to 90° with respect to the easy axis as possible, the W drive lines are kept, as accurately as possible, in alignment with the easy axis E of each cell 14. There is some freedom of direction with respect to the B row conductors; however, an orthogonal arrangement with respect to the W column conductors has been found to be best. Since the row conductors B are to be employed as a sense line during the read cycle, an orthogonal relationship between the W drive line during the read portion of the memory cycle provides best decoupling with respect to disturbance signals induced by energization of the W current conductors. It is the function of the word conductors W to rotate the magnetization of each cell 14 into the hard direction, while it is the function of the row conductor B, when energized, to apply a field directed along the easy axis E of the cell having its magnetization rotated in the hard direction to cause the magnetization to rotate in one or the opposite stable state, depending upon the polarity of the easy axis field, in defining a stored binary "1" or "0." The storage cells 14 not energized by the word column conductors W are not influenced by an easy axis field applied thereto by the energized row conductors B since the magnitude of this field is below the domain switching threshold $H_c$ and the rotational switching threshold $H_k$.

The operation cycle customary in the case of a word-organized memory array such as set forth in the above-cited copending application Ser. No. 217,768 is as follows: For writing in the magnetization of the respective storage cells is switched simultaneously into the hard direction by means 26 energizing a selected word line W. Under control of means 28, staggered slightly with respect to time by comparison with the word drive pulse, the selection and drive means 16 energize the bit lines B to simultaneously supply write pulses polarized according to the binary information to be stored which, after the word drive pulse has ceased, supply the resetting torques for the unambiguous rotational switching of the magnetization of the respective storage cell into the predetermined rest position (0 or 1). For reading out the information stored in the storage cells of the binary orders of one word, it is necessary that address means 26, under control of means 28, energize a selected word line W to simultaneously switch the magnetization in each storage cell 14 of this word into the hard direction. Depending on the previously assumed rest position (0 or 1) there is generated in every sense line belonging to a binary order a corresponding signal which is interpreted as binary 0 or 1. However, the stored information is destroyed by the readout process, since without the action of external field components capable of effecting a turn back, the return of the magnetization of the storage cells into the rest position is ambiguous. One of the possibilities for completing the readout operation consists in switching the magnetization into a common predetermined rest position, e.g., the binary 0 state, after the word drive pulse has ceased in all storage cells 14 of the selected word. For this purpose, it is necessary to provide a magnetic bias which can be supplied by the magnetic field of a permanent magnet or an electromagnet or by the magnetic field of a continuous current or current pulse in the bit lines. If however, the readout information content of the word is to be retained in the memory device, it has till now been necessary for the word drive pulse of the readout operation to be followed by a rewrite operation by means of respective write-in pulses in the bit lines.

According to the invention, however, the eddy currents which, with rotational switching of the magnetization of the thin magnetic film storage cells 14 occur in neighboring metallic conductors, are utilized for storing energy; their field reacts on the magnetization of the storage cells and supports the application of external field components or in the case of nondestructive readout also for the regeneration of the original information is even capable of replacing these. The word drive pulses in this case must be of sufficient strength that their drive fields will exceed the anisotropy field of the thin magnetic film storage cells. Values of from about two to six time the amount are favorable.

Figure 3:
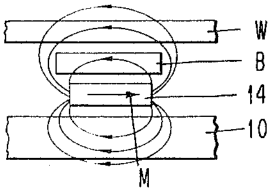
FIG. 3 illustrates a side view of a storage cell of FIG. 1 according to one embodiment of this invention.

FIG. 3 illustrates schematically a storage cell 14 in a remanent state and its state flux pattern. The direction of the easy axis of the magnetization corresponds to the direction of arrow M. In the interest of clarity, only those elements are shown which are essential for the achievement of the desired effect. The insulation layers of the memory device have been left out of the illustration. The thin magnetic film storage cell 14, seen from the longitudinal edge, is located on the conducting metallic base plate 10. Above the plate 10, the bit-sense line B in the form of a stripline covering the entire storage cell 14 is shown followed by a word drive line W in the form of a stripline extending in the X direction in the plane of the drawing. As is indicated by the arrow M pointing to the right in the storage cell 14, the remanent magnetization of the thin magnetic film is located in one of the two rest positions along the easy axis. At the ends of the thin magnetic film of storage cell 14 regular magnetic poles are formed. The associated magnetic field lines close in a manner drawn about the cell 14 in outer space. These magnetic field lines penetrate the neighboring metallic conductors 10, B, and W similar in manner to the way the field would behave if it were in air, since the relative permeability of the metals used is sufficiently similar to the permeability of air.

Figure 4:
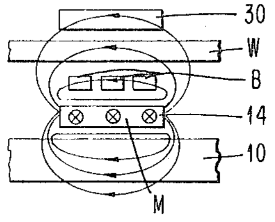
FIG. 4 illustrates a side view of a storage cell according to other embodiments of this invention.

In a similar manner, FIG. 4 illustrates a pattern of the field immediately after the rotational switching of the magnetization of the thin magnetic film when the original magnetic field is still maintained by the eddy currents in the neighboring metallic conductors. The thin magnetic film storage cell seen from the longitudinal edge is designated by 14. It is located on the metallic base plate 10. The sense line B in this case is a stripline provided with slots and consists, for example, of three parallel conductors. Above, is located the drive line W necessary for the rotational switching of the magnetization into the hard direction. In addition, positioned above the drive conductor W a conductive stripline 30 is shown which extends in the Y direction. The conductive stripline 30 may be utilized in a memory such as shown in the aforesaid memory disclosed in application Ser. No. 217,768, wherein the line 30 is utilized as a row conductor and is connected directly to the bit selection means 16 in FIG. 1, while the sense line B is connected directly to a load 20. Within storage cell 14 there is indicated, symbolically by the arrow ends drawn as oblique crosses, a dynamic state of the device wherein the magnetization M is receding from the observer and is thus pointing into the hard direction of the film. The static field traversing the metallic conductors 10, B, W, and 30 in the quiescent state of the device is also shown. The static field contributes to the effect of the eddy currents induced in the neighboring metallic conductors by the rapid flux change experienced therein due to the rotation of the magnetization of storage cell 14. Although no magnetic poles can be formed now at the two external sides of storage cell 14, since it is a prerequisite that the magnetization should be rotated directly into the hard direction under the force of an external drive field, the field lines endeavor to close in the X direction as they did previously. Thus, the field lines which are partly forced out of storage cell 14 tend to switch the magnetization of storage cell 14 back into the original remanent state along the easy axis E if, and only if, the drive pulse in line W loses its switching effect into the hard direction at the right time.

Referring to FIGS. *5a* and *5b*, the behavior in time of the eddy currents induced in neighboring metallic conductors is illustrated by curve 32 in FIG. *5a* with respect to the requisite timing of a drive pulse to conductor W illustrated by curve 34 in FIG. *5b*. FIG. *5a* shows qualitatively, in random units, the characteristic with respect to time of induced eddy currents $I_e$. After a steep rise up to a maximum value, there follows a slower and somewhat exponential drop. It is possible to set a lower limit $I_o$ for the strength of the eddy currents, up to which the eddy currents are still capable of unequivocally switching back into a certain rest position the magnetization of a storage cell deflected into the hard direction, after the drive pulse has decayed. FIG. *5b*, shown below, illustrates with the same time scale the characteristic with respect to time of the current intensity $I_w$ of a drive pulse. The steep leading edge of this drive pulse is responsible for the extremely fast rotational switching of the magnetization of the storage cell 14 into the hard direction and a consequently steep rise of the eddy currents $I_e$ up to a maximum value. The drive pulse utilized to rotate the magnetization of element 14 is shown as a square-shaped wave by curve 34; however, other wave forms are possible such as the Gaussian wave form or very sharp pulses and the like. Independent of the wave form 34 of the drive pulse $I_w$ applied to a word line W, eddy currents $I_e$ are generated by rotational switching of the magnetization of the storage cell which fall from a maximum value in an approximately exponential manner, depending on the conductivity of the neighboring metallic conductors. Drive pulse $I_w$ should cease to exist within the space of time $\tau$, the period within which the eddy currents $I_e$ are still sufficiently strong to unambiguously reorient the magnetization of cell 14 and have not yet fallen below the limiting value $I_o$ as defined above and illustrated in FIG. *5a*.

It is therefore essential that the drive pulses for rotating the magnetization of a thin film storage cell 14 into the hard direction be sufficiently short so that the current terminates before substantial reduction of the eddy currents. Since the eddy currents induced in the neighboring conductors, generated by the rotational switching of the thin magnetic film 14, have not yet decayed upon termination of the drive field $I_W$ to a word conductor W, they are still capable of retrospectivly influencing the magnetization of the film. Suitable values for the average pulse width of the drive pulses in the word lines lie between 1 ns., of the order of magnitude of the duration of rotational switching in thin magnetic films, and approximately 50 ns. (1 ns.$=10^{-9}$ sec.). In one embodiment, the average pulse width of the word pulses were 12 ns., of which approximately 5 ns. were apportioned to the rise time and 5 ns. to the decay time. The necessary amplitudes of the drive pulses are smaller than 1 ampere and, depending on the size of the memory device and/or the length of the word, respectively range between 400 ma. and 700 ma. With the size of the storage cell mentioned above as an example, drive pulses of this value result in readout signals having an amplitude of 0.2 mv. to 10 mv. and a duration of about 5 ns. One part of the energy of the drive pulses is used to generate the eddy currents. This part can be estimated from the fact that for writing in binary information write pulses in the bit lines are required which have amplitudes of the order of magnitude of approximately 100 ma. This value, however, is also dependent upon the impedance of the bit lines covering all the storage cells of a binary order. The eddy currents for generating the field components driving back the magnetization, in place of a field applied by a drive pulse from outside are, however, only generated in those metal parts which are neighboring the storage cells of one single word.

The decay time of the generated eddy currents is influenced by the manner of arranging the neighboring metallic conductors with respect to the thin magnetic film storage cell. An essential element is the comparatively strong metallic base plate 10 of for instance 2 mm. thickness. The storage cells 14 must be immediately adjacent, on at least one side, to conducting metal masses in which eddy currents can occur. These eddy currents often develop only in a manner which is inadequate if on the upper side of the storage cells no further effective metal masses are present any more. It is possible, for example, at least in the lower layers of striplines, close to the storage cells (sense lines, drive lines) to finely subdivide the conductors, e.g., by means of longitudinal slots. In this manner, it is possible to hinder or interrupt the formation of eddy currents. In this way, it is possible to lose the intensity of the eddy currents in the desired manner.

In the arrangement according to FIG. 3, the sense line B completely covers storage cell 14, for example, in the first layer of the strip lines. In this way the generation of powerful eddy currents by the rotational switching of the thin magnetic film 14 is assured. However, a possible disadvantage is that disproportionately strong drive pulses are necessary in drive line W in order to switch the magnetization of storage cell 14 coherently into the hard direction due to the width of sense line B. Further, the sense lines of a thin magnetic film memory are usually aranged within the immediate neighborhood of the storage cells in order to be able to provide readout signals having the greatest possible induced voltage. Now, to enable the magnetic field of the drive pulses to penetrate to the storage cells 14 unhindered, the sense lines may be made as narrow as possible or to subdivide such lines by longitudinal slots.

FIG. 4 illustrates as an embodiment the sense line B subdivided into three parallel running conductors, above storage cell 14. It is equally possible to make sense line B narrower than the remaining striplines of the memory device, so that only about the central conductor of the three illustrated parallel running conductors B is adequate as a sense line. By way of an example, conductor 30 can be a bit or row drive line in a word-organized array. It is, however, also possible to arrange the bit line in the same position of conductors as the sense lines, so that, for example, in the case of conductor B the two outer lines of the three parallel running conductors belong to the bit line, while the inner one belongs to the sense line. It is then possible for conductor 30 to be eliminated. It is indeed possible to employ a common line as sense line and as bit line, only that in this case the expenditure of accessories to the memory device for separate handling of the signals is greater.

FIGS. 3 and 4 are not drawn to scale in so far as in actual devices the insulating intermediate layers between the individual elements shown are very thin, so that the individual layers of conductors are packed much closer together. Thus, the position of conductor 30 in FIG. 4 is definitely still suitable as location for the desired generation of eddy currents. If, for instance, a wide stripline, like bit line 30 has been omitted because the organization of the memory device made such a step necessary, additional metallic conductors can be provided in this layer of conductors or in a further layer above the bit lines, the purpose of which is merely to provide induced eddy currents generated by the rotational switching of the magnetic film of the storage cells. Such additional metallic conductors can be provided in the form of striplines which do not conduct any other signals, or could be in the form of metal plates.

The memory device according to the invention has the advantage, on the one hand, for example, that it can be operated in a word-organized array in an operation cycle in which a write-in operation succeeds a readout operation. This is effective for those operational sequences in which new information has to be written in after the readout. In addition, on the other hand, the operation cycle can be shortened for read-only operations when the information content of the memory remains unchanged. With the assistance of the energy stored by the induced eddy currents, nondestructive readout is provided so that the need for a renewed write in of the storage content just read out in eliminated. It is, nevertheless, possible without detriment to operate the memory device in such a way that after the readout all the storage cells are brought into a predetermined rest position, for example, into the 0 position. In order to ensure a favorable utilization of the induced eddy currents, it is necessary for the foregoing provisions which have been described in detail to be applied appropriately. Tightly packing the layers of metallic conductors promotes the development of powerful eddy currents.

While the invention has been particularly shown and described with reference to preferred embodiments thereof, it will be understood by those skilled in the art that various changes in form and details may be made therein without departing from the spirit and scope of the invention.

What is claimed is:

1. A magnetic memory comprising:

a plurality of planar uniaxial anisotropic thin magnetic film elements arranged in columns and rows, each said element having an anisotropic field strength H*k* and exhibiting an easy axis of remanent flux orientation and a hard direction of magnetization transverse with respect to the easy axis;

a plurality of row conductors each coupling all the elements in a respective row and traversing the elements transverse with respect to the easy axis thereof;

a plurality of column conductors each coupling all the elements in a respective column and traversing the elements along the easy axis thereof;

row selection and drive means;

utilization means;

switching means for connecting said row conductors to said row selection and drive means during a storing time interval of said memory and for connecting said row conductors to said utilization means during a read time interval of said memory;

a plurality of associated electrical conductive members each positioned in field coupling relationship with a respective one of said thin film elements;

column selection and drive means for energizing a selected one of said column conductors during both the storing time interval and the read time interval of said memory to apply a field to each element coupled greater than H*k* and thereby rotate their magnetization from an original stable state into the hard direction;

said row selection and drive means operative during the storing time of said memory for energizing said row conductors to apply a field directed along the easy axis of each element coupled whereby only the elements having both the row and column fields coincidently applied thereto is switched to a stable remanent state defined by the polarity of the field applied along the easy axis; and nondestructive readout means comprising, means including said column selection and drive means for similarly energizing a selected column conductor during the read time interval of said memory whereby a voltage is induced in each said row conductor indicative of the original state of the element coupled thereby and an eddy current is induced in each of the associated electrical conductive members for a predetermined time interval sufficient to apply a field along the easy axis of the associated thin film element and orient the magnetization thereof back to its original stable state; and, further means operative during the read time interval of said memory for terminating the energization of the selected column conductor within said predetermined time interval.

2. A data storage device comprising:

a planer uniaxial anisotropic thin magnetic film element having an anisotropic field strength H*k* and exhibiting an easy axis of remanent flux orientation defining opposite stable states and a hard direction of flux orientation transverse with respect to the easy axis;

a stripline shaped conductor traversing said element and positioned in field coupling relationship thereto;

means for energizing said conductor to apply a field in the plane of said element whose magnitude is greater than H*k* and directed transverse to the easy axis to cause the magnetization thereof to rotate from an original stable state to the hard direction, the arrangement of said conductor and said magnetic film element relative to each other being such that rotation of the film magnetization into the hard direction induces in said conductor eddy currents which during a predetermined time interval are capable of applying a field along the easy axis of said element tending to orient the magnetization thereof back to its original stable state; and, means for terminating the energization of said conductor within said predetermined time interval.

3. The device of claim 2, further comprising, a planer, nonmagnetizable, electrically conductive, substrate member having a coating of insulating material on one surface thereof with said thin film attached to the surface of said insulating layer, and wherein said conductor is ohmically connected to said substrate member.

4. A data storage device comprising:

a planar uniaxial anisotropic thin magnetic film element having an anisotropic field strength H*k* and exhibiting an easy axis of remanent flux orientation defining opposite stable states and a hard direction of flux orientation transverse with respect to the easy axis;

a plurality of conductors traversing said element positioned in field coupling relationship thereto;

means for energizing a first conductor of said plurality of conductors to apply a field in the plane of said element whose magnitude is greater than H*k* and directed transverse to the easy axis to cause the magnetization thereof to rotate from an original stable state to the hard direction, said magnetic film element being so related to a second conductor of said plurality of conductors that rotation of the film magnetization into the hard direction induces in said second conductor eddy currents which during a predetermined time interval are capable of applying a field along the easy axis of said element tending to orient the magnetization thereof back to its original stable state; and further means for terminating the energization of said first conductor within said predetermined time interval.

5. The device of claim 4, further comprising, selectively operable energization means connected to said second conductor for applying a field directed along the easy axis of said element, and output means connected to a third conductor of said plurality of conductors.

6. The device of claim 5, wherein all said conductors are in the form of striplines positioned one over the other intermediate layers of insulating material with the third conductor positioned closest to said thin film element.

7. The device of claim 6, wherein said first, second and third conductors are positioned above said thin film element intermediate layers of insulating material with said second and third conductors positioned in the same plane and said first conductor is positioned above said second and third conductors.

8. A data storage device comprising:

a planer uniaxial anisotropic thin magnetic film element having an anisotropic field strength H*k* and exhibiting an easy axis of remanent flux orientation defining opposite stable states and a hard direction of flux orientation transverse with respect to the easy axis;

a member made of electrically conductive material traversing said element and positioned in field coupling relationship thereto;

means for applying a field in the plane of said element transverse with respect to the easy axis of said element having a magnitude greater than H*k* to cause rotation of the magnetization of said element from an original stable state to the hard direction, said magnetic film element and said conductive member being so arranged in relation to each other that rotation of the film magnetization into the hard direction induces in said member eddy currents which during a predetermined time interval are capable of applying a field along the easy axis of the element tending to orient its magnetization back to the original stable state; and further means for terminating the application of said transverse field within said predetermined time interval.

9. A data storage device comprising:

a planar uniaxial anisotropic thin magnetic film element having an anisotropic field strength H*k* and exhibiting an easy axis of remanent flux orientation defining opposite stable states and a hard direction of flux orientation transverse with respect to the easy axis;

a first conductor coupling said element such as to apply a field in the plane of said element transverse with respect to the easy axis when energized;

a second conductor traversing said element transverse with respect to its easy axis and positioned in field coupling relationship thereto;

means for nondestructively reading out the state of said element comprising;

means for energizing said first conductor to apply a field whose magnitude is greater than H*k* and cause rotation of the magnetization of said element from an original stable state into the hard direction, said magnetic film element and said second conductor being so related to each other that rotation of the film magnetization into the hard direction induces in said second conductor eddy currents which during a predetermined time interval are capable of applying a field along the easy axis of said element tending to orient the magnetization thereof back to its original stable state; and further means for terminating the energization of said first conductor within said predetermined time interval.

10. A magnetic memory comprising:

a plurality of magnetic film storage elements arranged in rows and columns, each of said elements having an easy axis of remanent magnetization extending parallel with its respective column and having a transverse hard axis extending parallel with its respective row, the value of the binary digit stored in each such element being represented by the direction of the remanent magnetization vector along its easy axis;

column conductors respectively extending along said columns of storage elements, each of said column conductors being effective when energized to apply a transverse magnetic field along the hard axis of every storage element in its column for rotating the magnetization vector of each such element from its easy-axis position into its hard-axis position;

row conductors respectively extending along said rows of storage elements, there being at least one row conductor in each of said rows positioned sufficiently close to the storage elements of its row so that rotation of the magnetization vector in any such element into its hard-axis position produces in said row conductor substantial eddy currents which, during a certain time interval, tend to restore the rotated magnetization vector to its initial easy-axis position, at least one row conductor in each row being adapted to furnish on output signal in response to rotation of the magnetization vector in any of the storage elements of such row; and nondestructive interrogation means effective when operated to energize, for a limited time interval which is less than said certain time interval, a selected one of said column conductors for thereby causing the magnetization vector of each storage element in that column to be rotated into its hard-axis position, thereby to produce output signals from such elements and also to produce in at least some of said row conductors eddy currents which are effective, at the end of said limited time interval, to restore the magnetization vectors of such elements to their initial easy-axis positions.

11. A magnetic memory comprising:

a plurality of magnetic film storage elements arranged in rows and columns, each of said elements having an easy axis of remanent magnetization extending parallel with its respective column and having a transverse hard axis extending parallel with its respective row, the value of the binary digit stored in each such element being represented by the direction of the remanent magnetization vector along its easy axis;

column conductors respectively extending along said columns of storage elements, each of said column conductors being effective when energized to apply a transverse magnetic field along the hard axis of every storage element in its column for rotating the magnetization vector of each such element from its easy-axis position into its hard-axis position;

conductive members positioned in proximity to said rows of storage elements, there being at least one conductive member which is sufficiently close to the storage elements of each row so that rotation of the magnetization vector in any such element into its hard-axis position produces in said member substantial eddy currents which, during a certain time interval, tend to restore the rotated magnetization vector to its initial easy-axis position, said members also including at least one conductor for each row adapted to furnish an output signal in response to rotation of the magnetization vector in any of the storage elements of such row; and nondestructive interrogation means effective when operated to energize, for a limited time interval which is substantially less than said certain time interval, a selected one of said column conductors for thereby causing the magnetization vector of each storage element in that column to be rotated into its hard-axis position, thereby to produce output signals from such elements and also to produce in at least some of said conductive members eddy currents which are effective, at the end of said limited time interval, to restore the magnetization vectors of such elements to their initial easy-axis positions.

References Cited by the Examiner

UNITED STATES PATENTS

| | | | |
|---|---|---|---|
| 3,133,271 | 5/1964 | Clemons | 340—174 |
| 3,159,821 | 12/1964 | Rossing | 340—174 |
| 3,209,333 | 9/1965 | Russell | 340—174 |

OTHER REFERENCES

Digest of Technical Papers, 1960 International Solid-State Circuits Conference: "Thin Magnetic Films for Logic and Memory," by Proebster et al., Feb. 10, 1960, p. 22 and 23.

IBM Technical Disclosure Bulletin: "Non-Destructive Readout Memory," by Dietrich et al., vol. 5, No. 5, October 1962, p. 44.

BERNARD KONICK, *Primary Examiner.*

S. M. URYNOWICZ, *Assistant Examiner.*